United States Patent
Balmer-Millar et al.

(10) Patent No.: US 7,094,722 B2
(45) Date of Patent: Aug. 22, 2006

(54) $NO_x$ CATALYST AND METHOD OF SUPPRESSING SULFATE FORMATION IN AN EXHAUST PURIFICATION SYSTEM

(75) Inventors: Mari Lou Balmer-Millar, Chillicothe, IL (US); Paul W. Park, Peoria, IL (US); Alexander G. Panov, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 342 days.

(21) Appl. No.: 10/327,636

(22) Filed: Dec. 20, 2002

(65) Prior Publication Data

US 2004/0121899 A1    Jun. 24, 2004

(51) Int. Cl.
*B01J 29/06* (2006.01)
*B01J 29/064* (2006.01)
*B01J 29/068* (2006.01)
*B01J 29/072* (2006.01)
*B01J 29/08* (2006.01)
*B01J 29/18* (2006.01)
*B01J 29/65* (2006.01)

(52) U.S. Cl. ............ 502/60; 423/232; 423/213.2; 423/213.5; 423/239.2; 502/64; 502/65; 502/66; 502/71; 502/73; 502/74; 502/77; 502/78; 502/79

(58) Field of Classification Search ........ 502/64, 502/65, 66, 71, 73, 74, 77, 78, 79, 60; 423/239.2, 423/212, 213.2, 213.5
See application file for complete search history.

(56) References Cited

U.S. PATENT DOCUMENTS

| | | | |
|---|---|---|---|
| 5,318,760 A * | 6/1994 | Subramanian et al. ... | 423/239.2 |
| 5,514,355 A | 5/1996 | Eshita et al. | |
| 5,727,385 A | 3/1998 | Hepburn | |
| 5,993,764 A | 11/1999 | Tabata et al. | |
| 6,033,641 A * | 3/2000 | Hall et al. ............... | 423/239.2 |
| 6,165,429 A * | 12/2000 | Ikeda et al. .............. | 423/213.5 |
| 6,235,955 B1 * | 5/2001 | Yao et al. .................... | 585/418 |
| 6,365,118 B1 * | 4/2002 | Kharas et al. ........... | 423/213.2 |
| 6,387,246 B1 * | 5/2002 | Benazzi et al. ......... | 208/111.01 |
| 6,455,463 B1 * | 9/2002 | Labarge et al. ............. | 502/340 |
| 6,468,485 B1 * | 10/2002 | Elomari ................... | 423/213.2 |
| 6,638,485 B1 * | 10/2003 | Iida et al. .................... | 423/210 |
| 6,936,562 B1 * | 8/2005 | Cho et al. ...................... | 502/64 |
| 6,969,692 B1 * | 11/2005 | Brady et al. .................. | 502/66 |
| 2002/0022574 A1 | 2/2002 | Tanada et al. | |
| 2002/0053202 A1 | 5/2002 | Akama et al. | |
| 2003/0049200 A1 * | 3/2003 | Kuznicki et al. ........... | 423/713 |
| 2004/0236165 A1 * | 11/2004 | Carati et al. ................ | 585/418 |

FOREIGN PATENT DOCUMENTS

JP        02004453    *   1/1990   .............  423/239.2

* cited by examiner

*Primary Examiner*—Wayne A. Langel
(74) *Attorney, Agent, or Firm*—Liell & McNeil

(57) ABSTRACT

The activity and durability of a zeolite lean-burn NOx catalyst can be increased by loading metal cations on the outer surface of the zeolite. However, the metal loadings can also oxidize sulfur dioxide to cause sulfate formation in the exhaust. The present invention is a method of suppressing sulfate formation in an exhaust purification system including a $NO_x$ catalyst. The $NO_x$ catalyst includes a zeolite loaded with at least one metal. The metal is selected from among an alkali metal, an alkaline earth metal, a lanthanide metal, a noble metal, and a transition metal. In order to suppress sulfate formation, at least a portion of the loaded metal is complexed with at least one of sulfate, phosphate, and carbonate.

8 Claims, No Drawings

$NO_x$ CATALYST AND METHOD OF SUPPRESSING SULFATE FORMATION IN AN EXHAUST PURIFICATION SYSTEM

GOVERNMENT RIGHTS

This invention was made with government support under DOE contract number DE-FC05-97OR22579 awarded by the U.S. Department of Energy. The government has certain rights to this invention.

TECHNICAL FIELD

The present invention relates generally to a $NO_x$ catalyst in an exhaust purification system, and more particularly to suppression of sulfate formation in the exhaust purification system including $NO_x$ reduction.

BACKGROUND

It is well known that $NO_x$ (nitrogen oxides) emissions in internal combustion engine exhaust can be detrimental to the environment and, thus, are regulated by the government. In order to decrease the $NO_x$ emission in exhaust, engine exhaust purification systems are generally equipped with a $NO_x$ catalyst to reduce $NO_x$ in the exhaust gases to $N_2$ (nitrogen) prior to being emitted into the atmosphere. In a lean environment, meaning an environment where the fuel to air ratio is low, such as in diesel engine exhaust, zeolites containing a range of transition, alkali, alkaline earth, and lanthanide metals have been utilized as catalysts for lean $NO_x$ reduction with propene, alcohol, methane or diesel fuel being the reductants. The zeolite is loaded with a metal cation of the groups listed above so the metal cation can compensate for a net negative charge of the zeolite. For instance, exhaust gas purifying catalyst systems, such as that shown in U.S. Pat. No. 5,727,385 issued to Hepburn on Mar. 17, 1998, include a transition metal ion-exchanged zeolite acting as the lean-burn $NO_x$ catalyst.

Over the years, chemists have found that zeolites with higher metal loadings, particularly loadings that exceed stoichiometry, possess increased activity and durability for lean $NO_x$ reduction. The zeolite exceeds stoichiometry when the exact charge balance between the net negative framework charge and the charge compensating cations is exceeded by the loading of the cations, often resulting in excess cations on outer surfaces of the zeolite. The higher metal loadings act to reduce metal cation migration from active sites of the zeolite. Further, the higher metal loadings provide higher density of the zeolite active sites, resulting in increased activity for lean $NO_x$ reduction.

Although higher loadings of the metal cation on the zeolite increases the activity and durability of the zeolite, the higher metal loadings lead to increased formation of sulfate $(SO_4^{-2})$. The excess metal cations are a large contributor to the oxidation of sulfur dioxide $(SO_2)$, present in exhaust gas, to form sulfur trioxide $(SO_3)$ and sulfuric acid $(H_2SO_4)$. Sulfate formation deteriorates the purification capability of the $NO_x$ catalyst by sitting on the catalyst's active sites. Moreover, sulfate contributes to formation of particulate matter by serving as a nucleic site for the formation of particulate matter. Further, sulfate, upon which particulate matter does not form, may form sulfuric acid and enter the environment, eventually contributing to acid rain.

The present invention is directed to overcoming one or more of the problems set forth above.

SUMMARY OF THE INVENTION

In one aspect of the present invention, a $NO_x$ catalyst includes a zeolite that is loaded with at least one metal. The metal includes at least one of an alkali metal, an alkali metal, an alkaline earth metal, a lanthanide metal, a noble metal and a transition metal. At least a portion of the loaded metal is complexed with at least one of sulfate, phosphate, and carbonate.

In another aspect of the present invention, a method of suppressing sulfate formation in an exhaust purification system including a zeolite-based $NO_x$ catalyst includes a step of selecting at least one metal from among the alkali metals, the alkaline earth metals, the lanthanide metals, the noble metals and the transition metals. Cations of the selected metal are loaded onto a zeolite. At least a portion of the metal loadings are complexed with at least one of phosphate, sulfate, and carbonate. The metal loaded, complexed zeolite is exposed to exhaust gases.

DETAILED DESCRIPTION

The present invention is described for a lean burn $NO_x$ catalyst in an exhaust purification system for an internal combustion engine. A lean burn $NO_x$ catalyst is a catalyst that reduces $NO_x$ (nitrogen oxides) to $N_2$ (nitrogen) in engine exhaust, such as diesel engine exhaust, where the air to fuel ratio is higher than the stoichiometric air to fuel ratio during the majority of the operation of the engine. Those skilled in the art will appreciate that the $NO_x$ catalyst can be carried on a various conventional substrates, such as a monolith honeycomb substrate, positioned within an exhaust passage of the exhaust purification system.

The lean-burn $NO_x$ catalyst of the present invention includes a zeolite that is loaded with a metal selected from among an alkali metal, an alkaline earth metal, a lanthanide metal, a noble metal, and a transition metal. Although the zeolite could be any type of zeolite upon which the metals listed above can be loaded, MFI type (Mobile Five I type), Faujasite, beta-type, mordenite, and ferrierite are zeolites that are known to possess cation exchange capability and are preferred. It should be appreciated that the zeolites can be manually or naturally synthesized, and are readily commercially available. Although the metal can be selected from among the alkali metals, alkaline earth metals, lanthanide metals, noble metals and transition metals, transition and noble metals, such as copper, chromium, iron, cobalt, nickel, cadmium, sliver, gold, iridium, platinum, pladium, and maganese, or a mixture of transition and noble metals, are preferred.

The zeolite is preferably loaded with the metal cation, at least in part, by ion-exchanging the metal cation onto the zeolite. In the illustrated example of ZSM-5 as the zeolite, the zeolite is a microporous framework aluminosilicate where both an aluminum cation and a silicon cation are tetrahedrally coordinated by oxygen. ZSM-5 has a net negative charge on the framework due to an aluminum substitution on the tetrahedral site. There must be a charge compensating cation or proton associated with the zeolite in order to compensate for the net negative charge of the zeolite. Therefore, ZSM-5 will include cations, such as hydrogen or sodium, associated with ZSM-5 on exchange cites. According to the present invention, these ions are exchanged for the metal cations which will also compensate for the net negative charge of the zeolite. Those skilled in the art will appreciate that there are metal cations other than aluminum and silicon that could be included in the microporous charged framework structure. Further, those skilled in the art will appreciate that the ratio of aluminum to silicon can vary, and affect the cation exchange capability of the zeolite. It should be appreciated that the present invention is applicable to zeolites including various aluminum to silicon ratios and framework cations other than aluminum and silicon. Regardless of the aluminum to silicon ratio, the metal cation is preferably exchanged onto ZSM-5 to exceed stoichiometry, being the exact charge balance between the framework charge and the cation.

The loaded metal preferably includes a first portion which is ion-exchanged onto the zeolite and a second portion which is complexed with at least one of sulfate, phosphate, and carbonate. Those skilled in the art appreciation that complexation refers to a reaction in which a metal ion and one or more anionic ligands chemically bond. Although the present invention will be illustrated with the first portion and the second portion including the same metal cation, the present invention contemplates the second portion of the loaded metal including a different metal or combination of different metals selected from among alkali metal, alkaline earth metals, lanthanide metals, noble metals, and transition metals than the first portion. The second portion of the loaded metal is loaded on the outer surface of the zeolite, whereas, the first portion is ion-exchanged onto the exchange sites of the zeolite. It should be appreciated that the loading of the metal cations on the outer surfaces of the zeolite can be accomplished by various techniques, including but not limited to, ion-exchange and solution impregnation.

Because it is known in the art that the excess outer surface metal cations increase activity and durability of the zeolite, relatively high loadings of the metal cations are preferred. The present invention contemplates metal loadings up to 500% of the cation content of the zeolite. It should be appreciated that the complexation could occur prior to, after, or simultaneously with the completion of the metal loading. If the complexation occurs prior to the completion of the metal loading, the second portion of the metal will be loaded onto the zeolite in the form of at least one of metal sulfate, metal phosphate, and metal carbonate. If the complexation occurs after the completion of the loading, the second portion of the loaded metal being more active than the fixed, ion-exchanged first portion of the loaded metal can complex with the sulfate, phosphate or carbonate, when treated with sulfuric acid, phosphoric acid, and carbonic acid.

Industrial Applicability

Although the application of the present invention will be discussed for copper exchanged ZSM-5, it should be appreciated that the application of the present invention is similar for various types of zeolites loaded with various types of metals. Further, although the present invention will be discussed for the complexation of the loaded copper cation with sulfate, it should be appreciated that the present invention operates similarly when utilizing phosphate or carbonate as the complexation anion. Although the present invention illustrates, in four embodiments, four methods of metal loading and complexation, they are considered equivalent without preference.

In order to suppress sulfate formation in the exhaust purification system including the zeolite-based $NO_x$ catalyst, at least one metal from among the alkali metals, alkaline earth metals, lanthanide metals, noble metals, and transition metals is selected to be complexed onto the zeolite. Although any of the metals above can be loaded onto the zeolite, preferably at least one of the transition or noble metals will be selected. In the illustrated example, copper is selected.

According to a first embodiment of the present invention, copper cations are loaded onto ZSM-5, at least in part, by ion-exchanging the charge compensating cation or proton of ZSM-5 with copper in any conventional manner known in the art, including but not limited to, solid state exchange, incipient wetness, and solution impregnation with a water soluble copper salt, such as copper nitrate or copper acetate. The ion-exchange is performed at room temperature, and preferably under conditions that allow complete loading onto the ion-exchange sites and with multiple exchanges to drive the highest possible copper loadings. It should be appreciated that there are various cations, such as sodium and hydrogen, then may serve as the charge compensating cation or proton which is exchanged with copper. The copper exchanged ZSM-5 is washed with copious amounts of deionized water in order to remove the excess copper cations from the outer surface that did not ion-exchange onto ZSM-5. After the first portion of the copper has been ion-exchanged onto the exchange sites of ZSM-5, the second portion of copper is loaded onto the outer surface of Cu-ZSM-5 in the form of copper sulfate. Thus, in the first embodiment, the copper and the sulfate have already been chemically bonded by complexation prior to being loaded onto ZSM-5. The copper sulfate can be loaded onto the outer surface of ZSM-5 in any conventional manner known in the art. In the illustrated example, the copper sulfate is loaded onto the outer surfaces in a controlled manner by standard solution impregnation techniques. It should be appreciated that the present invention contemplates the copper loadings on the outer surface in any amount up to 500% of the cation content of ZSM-5. It should be appreciated that sulfate can be complexed with a different metal than the metal ion-exchanged onto ZSM-5. For instance, copper could be ion-exchanged onto ZSM-5, whereas, silver sulfate could be the second portion of the loadings deposited on the outer surfaces of ZSM-5. The ion-exchanged, solution impregnated ZSM-5 is then heat-treated at temperatures below the sulfate decomposition temperature in order to remove the salt and oxidize the copper on the exchange cites. Those skilled in the art will appreciate that ZSM-5 should be treated for a time period sufficient to remove the salt, approximately one half to one hour.

In the second embodiment of the present invention, copper is loaded onto the zeolite, at least in part, by ion-exchanging ZSM-5 with a copper salt, such as copper nitrate or copper sulfate, in a conventional manner. Just as with the first embodiment, the ion-exchanging on the zeolite powder is accomplished in the standard way at room temperature with multiple exchanges to drive the highest possible copper loadings. Preferably, the copper is loaded onto ZSM-5 to exceed the stoichiometry of ZSM-5, meaning that the more copper cations are exchanged onto the zeolite than needed to compensate for the net negative charge of the zeolite. Thus, the second portion of the copper cations will not exchange onto the zeolite and will remain on the outer surfaces of the zeolite. However, unlike the first embodiment, according to the second embodiment, the excess copper cations on the outer surfaces of ZSM-5 are not removed by washing with deionized water. Rather, ZSM-5 is treated with sulfuric acid in order to sulfate the outer copper cations. Thus, the loading of the second portion of copper cations is completed prior to complexation of the second portion of copper cations. The complexation occurs on the outer surfaces of ZSM-5.

According to a third embodiment, as with the first and second embodiments, the copper is loaded onto the zeolite, in part, by ion-exchanging by ordinary methods, including but not limited to solution impregnation, solid state exchange, and incipient wetness. The ion-exchange is preferably performed under conditions that allow high loadings of the copper cations, resulting in the zeolite exceeding stoichiometry. The copper-exchanged ZSM-5 can be washed in order to remove the excess outer copper cations similar to the first embodiment of the present invention. Copper nitrate is deposited on the outer surface of the washed copper-exchanged ZSM-5, although various copper salts soluble in water could be used. ZSM-5 is then heated in order to decompose the nitrate, which would occur preferably between 500–600° C. within one half to one hour. After the nitrate is decomposed, the copper-exchanged ZSM-5 with the copper salt on its outer surface is treated with a diluted sulfuric acid to sulfate the outer surface copper cations. In the third embodiment, complexation occurs after the completion of the loading.

According to a fourth embodiment of the present invention, the complexation of the copper sulfate occurs prior to any loading of the copper. The copper sulfate is loaded onto ZSM-5 by ion-exchanging ZSM-5 with a water-soluble copper sulfate salt, such as a nitrate or an acetate. As with the other embodiments, the copper sulfate is ion-exchanged in the standard way at room temperature with multiple exchanges to drive the highest possible copper sulfate loadings. Preferably, the exchange exceeds stoichiometry and excess copper sulfate will be on the outer surfaces. The excess copper sulfate salt on the outer surfaces of ZSM-5 will not be removed by washing with deinoized water. Rather, ZSM-5 will be heat treated at temperatures less than the sulfate decomposition temperature in order to remove the salt from the copper sulfate. Further, the heat treatment can remove the salt from the ion-exchanged copper cations and oxidize the cations. Those skilled in the art will appreciate that the heat treatment will last for approximately one half to one hour.

Regardless of how the sulfated, copper-exchanged $NO_x$ catalyst is manufactured, the sulfated, copper-exchanged zeolite will be positioned within the exhaust purification system in order to make contact with the exhaust gas. The $NO_x$ catalyst will generally be wash coated onto a honeycomb monolith carrier within the exhaust gas passage of the engine in a conventional manner. The exhaust gas making contact with the $NO_x$ catalyst includes sulfur dioxide ($SO_2$). The second portion of the copper loading, being the copper loaded on the outer surface of ZSM-5, is relatively stabilized due to the complexation with sulfate. Thus, as the exhaust passes through the exhaust passage, there are little, if any, copper cations on the outer surface of ZSM-5 that can oxidize sulfur dioxide to form sulfate and sulfuric acid that could be emitted into the atmosphere and/or deactivate the $NO_x$ catalyst. However, because there is still copper loaded on the outer surfaces of ZSM-5, the durability and activity of copper-exchanged ZSM-5 for lean $NO_x$ reduction remains increased. The copper sulfate can still minimize metal migration from the active sites and increase density of activity sites of the zeolite.

The present invention is advantageous because it suppresses sulfate formation in the exhaust purification system without decreasing the activity and durability of the zeolite. The activity and durability of the $NO_x$ catalyst is increased by the loading of excess metal cations on the outer surface of the zeolite, but the ability of the metal cation to oxidize sulfur dioxide to form sulfate within the exhaust purification system is decreased by the complexation of the outer surface metal cation. Thus, the lean-burn $NO_x$ catalyst can reduce $NO_x$ to nitrogen and oxygen for output from the exhaust purification system without producing unacceptable levels of sulfate in the exhaust. Because sulfate can act as the nucleus for particulate matter formation, reducing the amount of sulfate in the exhaust also results in decreased particulate matter, and thus decreased smoke in the exhaust.

Further, reducing the amount of sulfate within the exhaust increases the activity of the $NO_x$ catalyst, itself. Sulfate can position itself on the active site of the $NO_x$ catalyst and deactivate the catalyst. Lastly, sulfate emissions from the exhaust purification system are undesirable in the environment. For instance, sulfate can ultimately contribute to acid rain.

It should be understood that the above description is intended for illustrative purposes only, and is not intended to limit the scope of the present invention in any way. Thus, those skilled in the art will appreciate that other aspects, objects, and advantages of the invention can be obtained from a study of the drawings, the disclosure and the appended claims.

What is claimed is:

1. A $NO_x$ reducing catalyst with sulfate formation suppression, comprising:
    a zeolite loaded with at least one metal;
    the metal is selected from a group consisting of an alkali metal, an alkaline earth metal, a noble metal, a lanthanide metal and a transition metal;
    a second portion of the loaded metal being loaded on an outer surface and chemically bonded to an $SO_2$ oxidation suppressant that is selected from a group consisting of sulfate, phosphate, and carbonate, and a first portion of the loaded metal being metal cations at exchange sites of the zeolite; and
    the first portion being to promote NOx reduction, but the second portion being to suppress oxidation of $SO_2$ when an outer surface of the zeolite contacts internal combustion engine exhaust mixed with a reductant.

2. The $NO_x$ catalyst of claim 1 wherein the loaded metal comprises a first portion and a second portion; and
    the first portion being ion-exchanged with the zeolite at the exchange sites;
    the second portion being loaded, at least in part, on an outer surface of the zeolite, and being complexed with sulfate.

3. The $NO_x$ catalyst of claim 2 wherein the loaded metal exceeds stoichiometry of the zeolite.

4. The $NO_x$ catalyst of claim 1 wherein the loaded metal is selected from a group consisting of a transition metal and a noble metal.

5. The $NO_x$ catalyst of claim 1 wherein the zeolite is selected from a group consisting of MFI type, Faujasite, beta-type, mordenite, and ferrierite.

6. The $NO_x$ catalyst of claim 3 wherein the metal comprises a transition metal; and
    the zeolite being selected from a group consisting of MFI type, beta-type, AIDA, mordenite, and ferrierite.

7. The catalyst of claim 2 wherein the metal cations and the complexed metal are of the same metal.

8. A NOx reducing catalyst with $SO_2$ oxidation suppression, comprising:
    a zeolite with exchange sites loaded with NOx reducing catalytic metal cations to promote NOx reduction in lean burn engine exhaust mixed with a reductant;
    the zeolite having an outer surface including a metal complexed with a material, which is selected from a group consisting of sulfate, phosphate and carbonate, to suppress oxidation of $SO_2$ in lean burn engine exhaust mixed with a reductant that contacts the outer surface; and
    wherein the zeolite is loaded with copper cations at exchange sites for NOx reduction and copper sulfate for $SO_2$ formation suppression at the outer surface.

* * * * *

UNITED STATES PATENT AND TRADEMARK OFFICE
CERTIFICATE OF CORRECTION

PATENT NO. : 7,094,722 B2  Page 1 of 1
APPLICATION NO. : 10/327636
DATED : August 22, 2006
INVENTOR(S) : Mari Lou Balmer-Millar et al.

It is certified that error appears in the above-identified patent and that said Letters Patent is hereby corrected as shown below:

On the Title Page, Item -57- line 1 the abstract, please change the word "lean-bum" to --lean-burn--

Signed and Sealed this

Nineteenth Day of June, 2007

JON W. DUDAS
*Director of the United States Patent and Trademark Office*